United States Patent
Solan, Jr. et al.

(10) Patent No.: US 9,634,594 B2
(45) Date of Patent: *Apr. 25, 2017

(54) METHODS AND SYSTEMS FOR AUTOMATIC ROTATION DIRECTION DETERMINATION OF ELECTRONICALLY COMMUTATED MOTOR

(71) Applicant: Regal Beloit America, Inc., Beloit, WI (US)

(72) Inventors: Stephen Solan, Jr., Alpharetta, GA (US); Brian L. Beifus, Fort Wayne, IN (US); Roger C. Becerra, Fort Wayne, IN (US)

(73) Assignee: Regal Beloit America, Inc., Beloit, WI (US)

( * ) Notice: Subject to any disclaimer, the term of this patent is extended or adjusted under 35 U.S.C. 154(b) by 11 days.

This patent is subject to a terminal disclaimer.

(21) Appl. No.: 14/467,932

(22) Filed: Aug. 25, 2014

(65) Prior Publication Data

US 2014/0361716 A1    Dec. 11, 2014

Related U.S. Application Data

(60) Continuation of application No. 13/942,253, filed on Jul. 15, 2013, now Pat. No. 8,847,526, which is a continuation of application No. 13/366,053, filed on Feb. 3, 2012, now Pat. No. 8,487,562, which is a continuation of application No. 12/499,731, filed on Jul. 8, 2009, now Pat. No. 8,111,029, which is a division of application No. 11/142,136, filed on May 31, 2005, now Pat. No. 7,573,217.

(51) Int. Cl.
H02P 7/00 (2016.01)
H02P 6/22 (2006.01)
H02P 6/06 (2006.01)
H02P 6/30 (2016.01)

(52) U.S. Cl.
CPC ............... *H02P 6/22* (2013.01); *H02P 6/06* (2013.01); *H02P 6/30* (2016.02)

(58) Field of Classification Search
CPC   H02P 6/14; H02P 6/16; B62D 5/0463; B62D 5/046
USPC ............. 318/432, 461, 400.01, 400.07
See application file for complete search history.

(56) References Cited

U.S. PATENT DOCUMENTS

| | | |
|---|---|---|
| 4,390,826 A | 6/1983 | Erdman et al. |
| 4,636,936 A | 1/1987 | Boyd, Jr. et al. |
| 4,638,233 A | 1/1987 | Erdman |
| 4,757,603 A * | 7/1988 | Stokes .......... H02K 1/27 264/272.2 |
| 5,198,733 A | 3/1993 | Wright |
| 5,376,866 A | 12/1994 | Erdman |
| 5,410,230 A * | 4/1995 | Bessler ........ F24F 11/0009 318/471 |
| 5,418,438 A | 5/1995 | Hollenbeck |
| 5,423,192 A | 6/1995 | Young et al. |

(Continued)

*Primary Examiner* — Rina Duda
(74) *Attorney, Agent, or Firm* — Armstrong Teasdale LLP

(57) ABSTRACT

A method for determining a direction of rotation for an electronically commutated motor (ECM) is described. The motor is configured to rotate a blower and the method comprises rotating the blower using the ECM and determining if the resulting blower rotation is indicative of the desired direction of rotation for the blower.

18 Claims, 3 Drawing Sheets

(56) References Cited

U.S. PATENT DOCUMENTS

| | | | |
|---|---|---|---|
| 5,492,273 A * | 2/1996 | Shah | F24F 11/0009 236/11 |
| 5,592,058 A | 1/1997 | Archer et al. | |
| 5,720,231 A * | 2/1998 | Rowlette | F23N 1/06 110/162 |
| 5,818,183 A | 10/1998 | Lambert et al. | |
| 5,818,194 A | 10/1998 | Nordby | |
| 5,838,127 A | 11/1998 | Young et al. | |
| 5,986,419 A * | 11/1999 | Archer | H02K 29/12 318/400.02 |
| 6,078,152 A | 6/2000 | Dieterle et al. | |
| 6,215,261 B1 | 4/2001 | Becerra | |
| 6,396,226 B2 | 5/2002 | Schmider et al. | |
| 6,429,615 B2 | 8/2002 | Schmider et al. | |
| 6,452,349 B1 | 9/2002 | Hahn et al. | |
| 6,456,023 B1 | 9/2002 | Becerra et al. | |
| 6,456,024 B1 | 9/2002 | Schmider et al. | |
| 6,462,494 B1 * | 10/2002 | Schone | F04D 27/004 318/433 |
| 6,825,627 B2 | 11/2004 | Berroth et al. | |
| 6,903,526 B2 | 6/2005 | Weisser et al. | |
| 7,573,217 B2 | 8/2009 | Solan, Jr. et al. | |
| 7,990,092 B2 | 8/2011 | Woodward | |
| 8,049,459 B2 | 11/2011 | Woodward | |
| 8,111,029 B2 | 2/2012 | Solan et al. | |
| 2001/0048278 A1 * | 12/2001 | Young | H02P 6/085 318/400.29 |
| 2002/0117986 A1 | 8/2002 | Becerra et al. | |
| 2003/0021692 A1 | 1/2003 | Adams et al. | |
| 2004/0112096 A1 | 6/2004 | Stephens | |

* cited by examiner

METHODS AND SYSTEMS FOR AUTOMATIC ROTATION DIRECTION DETERMINATION OF ELECTRONICALLY COMMUTATED MOTOR

CROSS-REFERENCE TO RELATED APPLICATIONS

This application is a continuation application of and claims priority to U.S. patent application Ser. No. 13/942,253, filed Jul. 15, 2013, which is a continuation of and claims priority to U.S. patent application Ser. No. 13/366,053, filed Feb. 3, 2012, which is a continuation application of and claims priority to U.S. patent application Ser. No. 12/499,731 filed Jul. 8, 2009, which is a divisional application of and claims priority to U.S. patent application Ser. No. 11/142,136, filed May 31, 2005, all of which are hereby incorporated by reference in their entirety.

BACKGROUND OF THE INVENTION

This invention relates generally to electronically commutated motors (ECMs), and more particularly, to methods and systems for automatic determination of a rotation direction within electronically commutated motors.

Electronically commutated motors (ECMs) are used in a wide variety of applications because they are more efficient than known standard induction motors. ECMs include the efficiency and speed control advantages of a DC motor and minimize the disadvantages of DC motors, e.g., carbon brush wear, short life span, and noise. In Heating, Ventilation and Air Conditioning (HVAC) systems, as well as, known commercial air distributions systems, ECMs automatically adjust blower speed to meet a wide range of airflow requirements. Known ECMs use microprocessor technology to control fan speed, torque, air flow, and energy consumption.

As described above, ECM motors are generally utilized in air handling (blowers, fans) applications within HVAC systems. Blower wheels and housings are used in right and left hand configurations, i.e. clockwise and counter clockwise rotation. To minimize the motor models required by an OEM (Original Equipment Manufacturer) it is desirable to utilize a single motor to serve both blower rotation directions. Such a motor would also reduce errors caused by using several motor models when changing from a standard induction motor to an ECM. However, such a motor would also have a capability to detect the proper rotation direction for the blower in which it has been installed.

It is believed that some systems observe a coast-down of the blower to determine some data associated with a load for that blower which is then used to determine settings to be used in producing constant airflow. In other motor drives, the direction of rotation is changed either through communication to a motor drive computer or by changing the setting of a switch or placement of a jumper wire.

BRIEF DESCRIPTION OF THE INVENTION

In one aspect, a method for determining a direction of rotation for an electronically commutated motor (ECM), where the motor is configured to rotate a blower is provided. The method comprises rotating the blower using the ECM, measuring a speed of the blower for a predefined level of torque, and determining if the measured speed and applied torque are indicative of the desired direction of rotation for the blower.

In another aspect, a method for determining a direction of rotation for an electronically commutated motor (ECM), where the motor is configured to rotate a blower is provided. The method comprises rotating the blower using the ECM, applying an amount of torque necessary to rotate the blower at a predefined speed, and determining if the predefined speed and applied torque are indicative of the desired direction of rotation for the blower.

In yet another aspect, an air moving control system is provided that comprises a blower, an electronically commutated motor (ECM), and a controller. The ECM is configured to rotate the blower and the controller is configured to control rotation of the motor. The controller is further configured to determine if a direction of rotation of the ECM is the same as the desired direction of rotation of the blower.

In still another aspect, a control system configured to control operation of an electronically commutated motor (ECM) attached to a blower is provided. The control system comprises a motor controller configured to control a direction of rotation of the ECM and further configured to cause the ECM to rotate at one of a selected level of torque and a predefined speed. The control system further comprises a system controller configured to receive data relating to the amount of torque applied to the motor and a speed of rotation of at least one of the motor and the blower. The system controller is further configured to determine if a direction of rotation of the ECM is the same as the desired direction of rotation for the blower and instruct the motor controller to change the direction of rotation of the motor if the determination is negative.

DETAILED DESCRIPTION OF THE INVENTION

Figure 1:
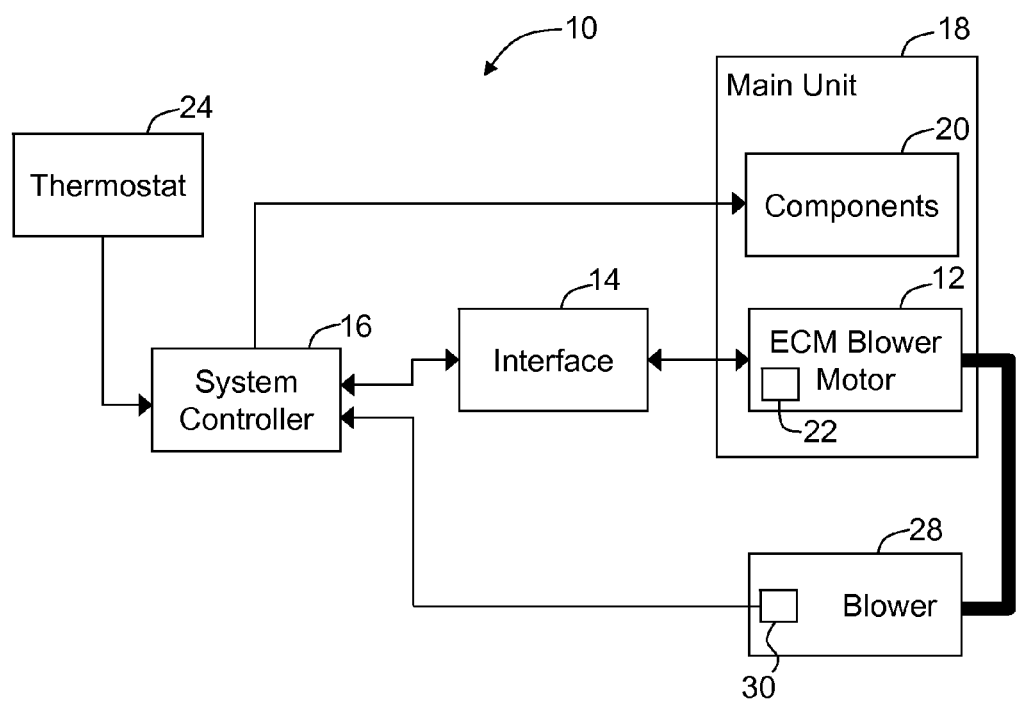
FIG. 1 is a block diagram of an air moving control system including an electronically commutated motor (ECM) and a blower.

FIG. 1 is a block diagram of an air moving control system 10 used to control an electronically commutated motor (ECM) 12. System 10 is an air moving control system, such as a residential heating, ventilation and air conditioning (HVAC) control system, a light industrial HVAC control system, or a clean room filtering control system. System 10 includes an interface circuit 14 electrically coupled to a system controller 16, for example a HVAC system controller, and a main unit 18, for example a HVAC unit. Main unit 18 includes components 20 and ECM 12. In one embodiment, ECM 12 is a motor configured to rotate a blower. Motor 12 includes a motor controller 22 including a microprocessor (not shown) and a memory (not shown) containing an ECM program. In one embodiment, system controller 16 is connected to a thermostat 24. Thermostat 24 includes a plurality of settings, or modes, such as low heat, high heat, cooling, dehumidify, and continuous fan. Additionally, thermostat 24 measures a temperature in a predetermined space or location and transmits an electrical signal representing the measured temperature to controller 16.

Controller 16 controls main unit 18 via interface circuit 14. Interface circuit 14 receives control signals in the form of input voltage signals from system controller 16 and translates the signals to signals suitable for controlling by ECM 12. Typically, circuits within system 10 operate at a different voltage level than does ECM 12. Therefore interface 14 is utilized for communications between controller 16 and ECM 12. Such interfaces typically control ECMs using pulse width modulation (PWM) by continuously adjusting motor speed.

The translated signals are transmitted to motor controller 22 of ECM 12, and a torque of ECM 12 is varied in accordance with the adjusted voltage outputs. ECM 12 is mechanically connected to a blower 28. In one embodiment, blower 28 includes a detection module 30 which provides signals, for example signals indicative of a speed of rotation of blower 28, to system controller 16. In one embodiment, blower 28 is a forward curved centrifugal blower.

System 10 is configured to automatically determine a proper direction of rotation for ECM 12. As used herein, the proper direction of rotation for a blower is the direction of rotation that causes the desired airflow through, for example, the HVAC system. Once the correct direction of rotation is determined, it is stored within the memory of motor controller 22 such that ECM will rotate in the proper (desired) direction upon subsequent applications of power. In certain embodiments, for example, a forward curved centrifugal blower, a curvature of the blades of blower 28 is such that blower 28 produces useful work in one direction only. As described above, ECM 12 is attached to blower 28. For a blower (e.g., blower 12), the load curve for a forward, or proper, direction of rotation is markedly different, than the load curve for reverse rotation. Specifically, a much higher torque, for a given rotation speed, must be applied to blower 28 for rotation in the proper direction. Once such a torque determination is made, the direction of rotation which resulted in the higher torque is stored within motor controller 22.

System 10 is configured to determine the proper direction of rotation for ECM 12. In one embodiment, system controller 16 and motor controller 22 are configured to cause ECM 12 to rotate at a set level of torque. Detection module 30 senses rotation, and a speed of rotation, of blower 28. Once ECM 12 is operating at the set level of torque, system controller 16 senses the speed of rotation of blower 28, and determines if the measured speed is a speed consistent for the applied torque level. If so, then ECM 12 (and blower 28) are rotating in the proper direction and the direction of rotation is stored within motor controller 22. If the resultant speed is too great, then it is determined that ECM 12 (and blower 28) are rotating in a direction opposite the desired direction, and the opposite direction of rotation is stored within motor controller 22 and is accessed during subsequent applications of power to ECM 12.

In an alternative embodiment, ECM 12 (and blower 28) are powered up to rotate at a selected speed. The speed can be measured utilizing either detection module 30 or motor controller 22. If the torque required to reach such a rotation speed is less than expected, ECM 12 (and blower 28) are not rotating in the desired direction and motor controller 22 memory is updated accordingly to ensure that ECM 12 is rotated in the correct direction when power is subsequently applied.

In another embodiment, controller 22 is configured to rotate ECM 12 (and blower 28) a small amount in each direction, such as one or two revolutions. Using detection module 30, the deceleration rates of blower 28 are observed when current is removed from ECM 12. The deceleration rates taken when passing through a given speed for each direction of rotation are compared, and the direction of rotation having the highest deceleration rate becomes the desired direction of rotation and is stored as such within the memory of motor controller 22. Alternatively, either or both of speeds and applied torque in each direction can be compared to determine the desired direction of rotation. Once the comparison is made and determination of the desired direction of rotation is completed, data indicative of the desired direction of rotation is stored within the memory of motor controller 22.

For any of the above described embodiments, the direction of rotation testing will be performed only on an initial power up of ECM 12, since the desired direction of rotation is stored in memory (e.g., memory within system controller 16 or within the memory associated with motor controller 22) for all following start ups of ECM 12. Since ECM 12 is intended to be continuously powered, the reoccurrence of the above described blower direction testing will be very infrequent.

Figure 2:
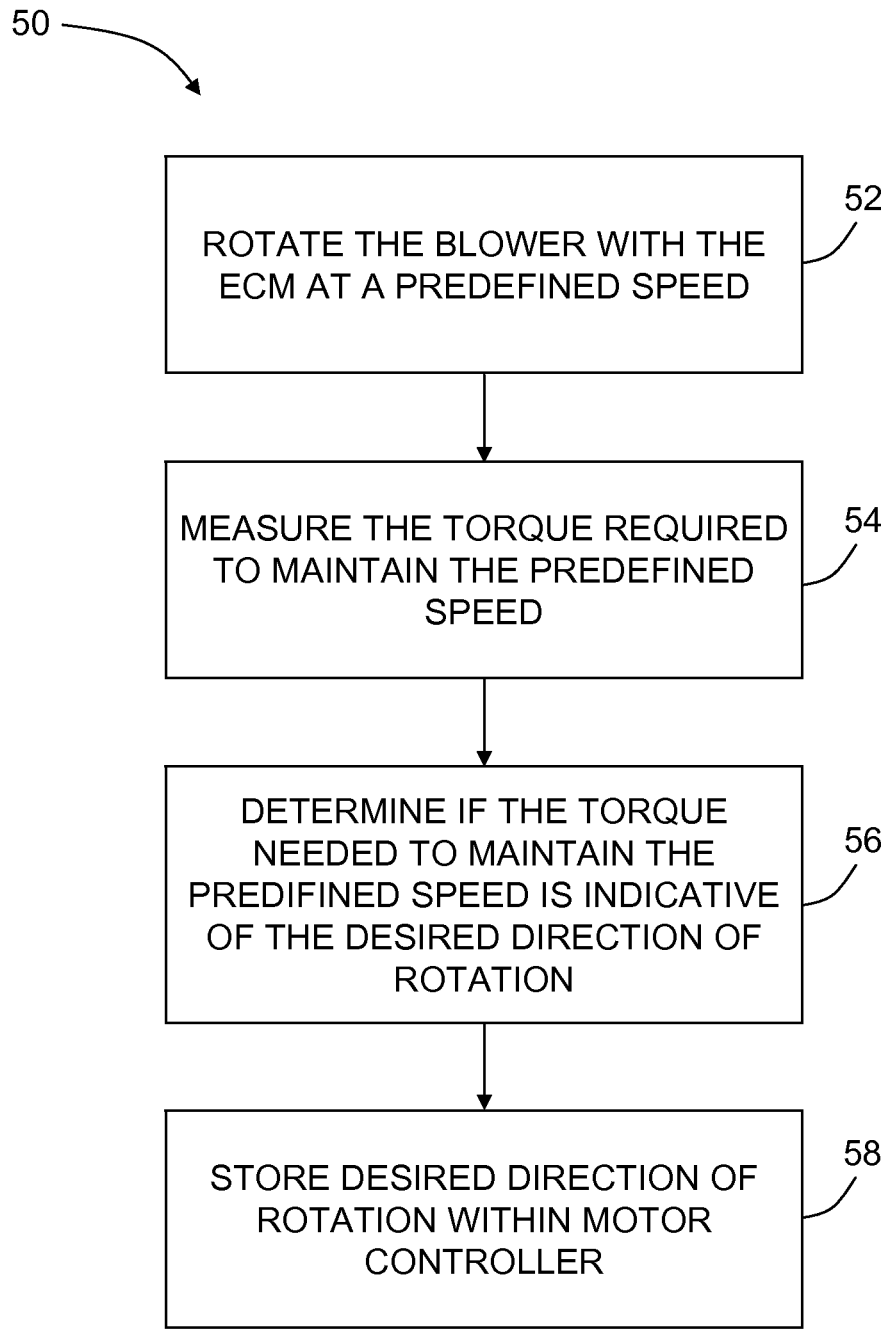
FIG. 2 is a flowchart illustration of a method for determining if the rotation of the ECM and blower at a predefined speed is in the desired direction of rotation.

FIG. 2 is a flowchart 50 illustrating a method for determining if the rotation of the ECM (such as ECM 12 shown in FIG. 1) and the blower (such as blower 28 shown in FIG. 1) at a predefined speed is in the desired direction of rotation. The blower is rotated 52 with the ECM at a predefined speed. The torque required to maintain the predefined speed is then measured 54. It is then determined 56, for example within system controller 16 (shown in FIG. 1), whether the torque needed to maintain the predefined speed is indicative of the desired direction of rotation. As described above, if the torque needed to maintain the desired speed is below an expected value, based on known characteristics of the blower, then the motor is rotating in a direction opposite the desired direction of rotation Once determination 56 of desired motor direction of rotation is complete, the data indicative of the desired direction of rotation for the motor is stored 58 within the motor controller.

Figure 3:
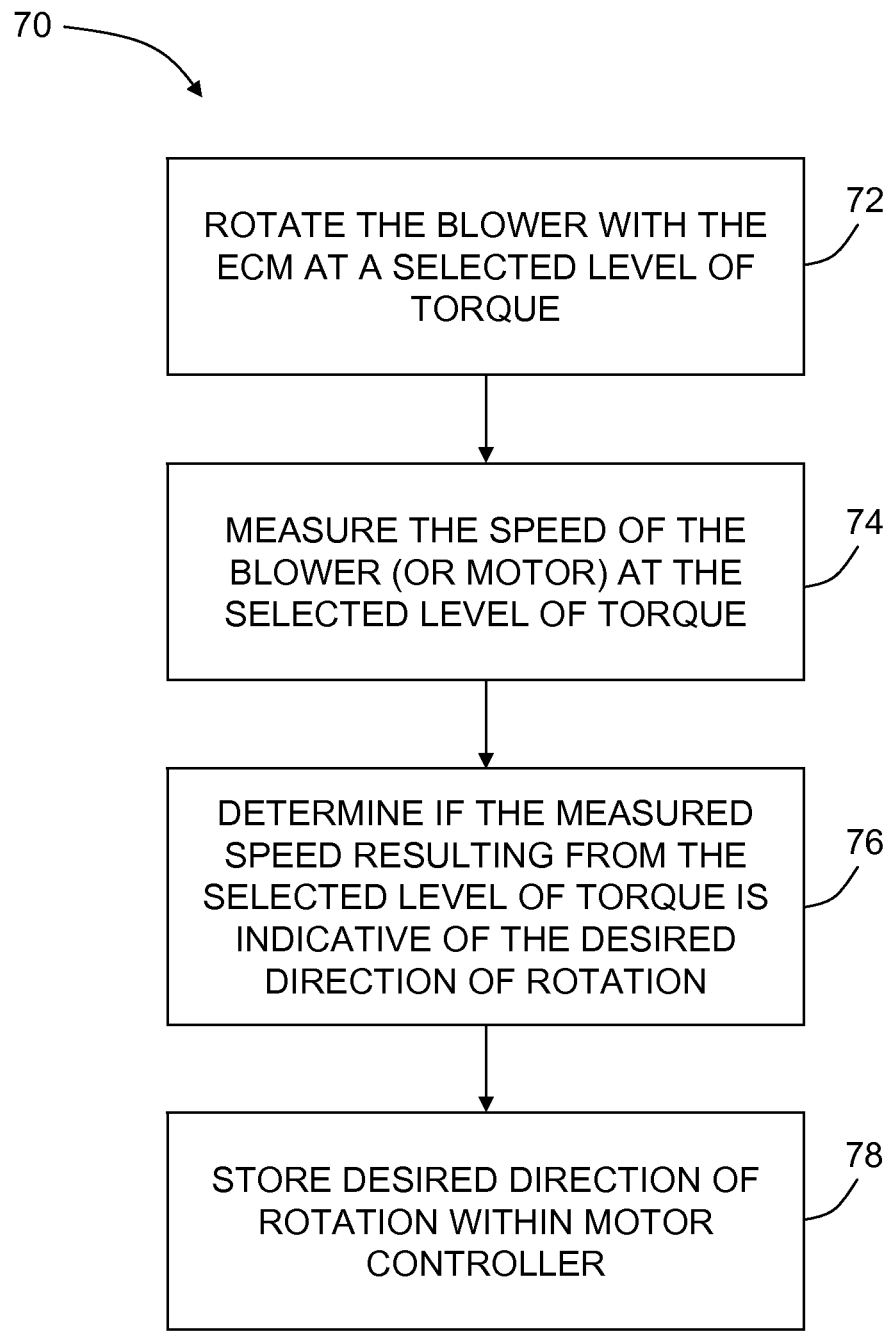
FIG. 3 is a flowchart illustration of a method for determining if the rotation of the ECM and blower at a selected level of torque is in the desired direction of rotation.

FIG. 3 is a flowchart 70 illustrating a method for determining if the rotation of the ECM (such as ECM 12 shown in FIG. 1) and blower (such as blower 28 shown in FIG. 1) at a selected level of torque is in the desired direction of rotation. The blower is rotated 72 with the ECM at a selected level of torque. The speed of the blower (or motor) is measured 74. It is then determined 76, for example within system controller 16 (shown in FIG. 1), whether the speed resulting from the selected level of torque is indicative of the desired direction of rotation. As described above, if the speed resulting from a selected level of torque is above an expected value, based on known characteristics of the blower, then the motor is rotating in a direction opposite the desired direction of rotation. Once determination 76 of desired motor direction of rotation is complete, the data indicative of the desired direction of rotation for the motor is stored 78 within the motor controller.

As described above, electronically commutated motors are typically used in air handling applications, for example, providing rotation to blowers and fans in HVAC systems. Known blower wheels and housings are found in both right hand and left hand configurations (clockwise and counterclockwise rotation) Using the methods and system above described, a user is able to minimize the number of different motor models needed to serve both blower rotation directions as the motor control system is able to detect the proper rotation direction that for the blower it is to drive. Therefore, the automatic detection of rotation direction and storage within the motor controller of the desired direction of rotation for subsequent power ups features provide motor model inventory reduction. Also, the feature results in a reduction or elimination of instances where the wrong direction of rotation motor is installed with a blower, thereby reducing production line failures at an OEM.

While the invention has been described in terms of various specific embodiments, those skilled in the art will recognize that the invention can be practiced with modification within the spirit and scope of the claims.

What is claimed is:

1. A motor controller configured to control an electric motor, the electric motor configured to rotate a blower, said motor controller comprising a processor in communication with a memory device, said processor configured to:
   automatically operate the electric motor to rotate the blower in a first mode of operation at a first operating parameter during an initial power-up of the electric motor;
   measure a first amount of a second operating parameter of the electric motor in the first mode of operation at the first operating parameter;
   determine whether the first mode of operation corresponds to a predefined mode of operation based on the measured first amount of the second operating parameter; and
   when the first mode of operation corresponds to the predefined mode of operation, automatically store the first mode of operation as a proper mode of operation in the memory device associated with said motor controller such that said motor controller operates the electric motor in the proper mode of operation during all subsequent power-ups after the initial power-up of the electric motor.

2. The motor controller according to claim 1, further configured to determine the first mode of operation corresponds to the predefined mode of operation when the measured first amount of the second operating parameter exceeds a threshold value.

3. The motor controller according to claim 1, further configured to operate the electric motor in a second mode of operation during subsequent power-ups when the first mode of operation does not correspond to the predefined mode of operation.

4. The motor controller according to claim 1, wherein:
   the first mode of operation is a first direction;
   the first operating parameter is one of a predefined speed of rotation and electric motor torque;
   the second operating parameter is one of electric motor torque and a predefined speed of rotation; and
   the predefined mode of operation is a predefined direction.

5. The motor controller according to claim 1, further configured to:
   operate the electric motor in a second mode of operation at a second operating parameter; and
   measure a second amount of the second operating parameter of the electric motor in the second mode of operation at the second operating parameter.

6. The motor controller according to claim 5, further configured to compare the measured first and second amounts of the second operating parameter, wherein a higher amount of the second operating parameter corresponds to the predefined mode of operation.

7. The motor controller according to claim 5, wherein the second mode of operation is a second direction.

8. A method of configuring an electric motor to rotate a blower and to determine a proper mode of operation of the blower using a motor controller, said method comprising:
   automatically operating the electric motor to rotate the blower in a first mode of operation at a first operating parameter during an initial power-up of the electric motor;
   measuring a first amount of a second operating parameter of the electric motor in the first mode of operation at the first operating parameter;
   determining whether the first mode of operation corresponds to a predefined mode of operation based on the measured first amount of the second operating parameter; and
   when the first mode of operation corresponds to the predefined mode of operation, automatically storing the first mode of operation as a proper mode of operation in a memory device associated with the motor controller such that the motor controller operates the electric motor in the proper mode of operation during all subsequent power-ups after the initial power-up of the electric motor.

9. The method according to claim 8, further comprising determining the first mode of operation corresponds to the predefined mode of operation when the measured first amount of the second operating parameter exceeds a threshold value.

10. The method according to claim 8, further comprising operating the electric motor in a second mode of operation during subsequent power-ups when the first mode of operation does not correspond to the predefined mode of operation.

11. The method according to claim 8, wherein:
   the first mode of operation is a first direction;
   the first operating parameter is one of a predefined speed of rotation and electric motor torque;
   the second operating parameter is one of electric motor torque and a predefined speed of rotation; and
   the predefined mode of operation is a predefined direction.

12. The method according to claim 8, further comprising:
   operating the electric motor in a second mode of operation at a second operating parameter; and
   measuring a second amount of the second operating parameter of the electric motor in the second mode of operation at the second operating parameter.

13. The method according to claim 12, further comprising comparing the measured first and second amounts of the second operating parameter, wherein a higher amount of the second operating parameter corresponds to the predefined mode of operation.

14. The method according to claim 12, wherein the second mode of operation is a second direction.

15. A motor controller configured to control an electric motor, the electric motor configured to rotate a blower, said motor controller comprising a processor in communication with a memory device, said processor configured to:
   automatically operate the electric motor to rotate the blower in a first mode of operation at a predefined first operating parameter until the blower reaches a predefined amount of a second operating parameter during an initial power-up of the electric motor;
   measure a first amount of time for the blower to reach the predefined amount of the second operating parameter in the first mode of operation;

determine whether the first mode of operation is the proper mode of operation based on the first amount of time; and when the first mode of operation corresponds to the proper mode of operation, automatically store the first mode of operation as a proper mode of operation in the memory device associated with said motor controller such that said motor controller operates the electric motor in the proper mode of operation during all subsequent power-ups after the initial power-up of the electric motor.

16. The motor controller according to claim 15, further configured to:

operate the electric motor to rotate the blower in a second mode of operation at the predefined first operating parameter until the blower reaches the predefined amount of the second operating parameter; and measure a second amount of time for the blower to reach the predefined amount of the second operating parameter in the first mode of operation.

17. The motor controller according to claim 16, further configured to one of compare the first and second amounts of time, wherein a higher amount of time is indicative of the proper mode of operation, and compare the first amount of time to a threshold amount of time for the blower to reach the predefined amount of the second operating parameter in the first mode of operation.

18. The motor controller according to claim 16, wherein:

the first mode of operation is a first direction;

the first operating parameter is torque;

the second operating parameter is a speed of rotation; and the second mode of operation is a second direction.

\* \* \* \* \*